US010816391B2

(12) United States Patent
Dubost et al.

(10) Patent No.: US 10,816,391 B2
(45) Date of Patent: Oct. 27, 2020

(54) METHOD AND SYSTEM FOR OBTAINING AT LEAST ONE ACOUSTIC PARAMETER OF AN ENVIRONMENT

(71) Applicants: SAINT-GOBAIN ISOVER, Courbevoie (FR); SAINT-GOBAIN PLACO, Suresnes (FR)

(72) Inventors: Brice Dubost, Courbevoie (FR); Francois Sausset, Montrouge (FR)

(73) Assignees: SAINT-GOBAIN ISOVER, Courbevoie (FR); SAINT-GOBAIN PLACO, Suresnes (FR)

(*) Notice: Subject to any disclaimer, the term of this patent is extended or adjusted under 35 U.S.C. 154(b) by 183 days.

(21) Appl. No.: 15/757,797

(22) PCT Filed: Aug. 30, 2016

(86) PCT No.: PCT/FR2016/052144
§ 371 (c)(1),
(2) Date: Mar. 6, 2018

(87) PCT Pub. No.: WO2017/042451
PCT Pub. Date: Mar. 16, 2017

(65) Prior Publication Data
US 2019/0250028 A1    Aug. 15, 2019

(30) Foreign Application Priority Data
Sep. 8, 2015  (FR) ...................... 15 58318

(51) Int. Cl.
*G01H 7/00*    (2006.01)
(52) U.S. Cl.
CPC ..................... *G01H 7/00* (2013.01)
(58) Field of Classification Search
CPC ......................................... G01H 7/00
See application file for complete search history.

(56) References Cited

U.S. PATENT DOCUMENTS 5,729,612 A * 3/1998 Abel .................... H04R 29/001
                                                      381/1
6,970,568 B1 * 11/2005 Freeman ................ H04R 29/00
                                                    381/303

(Continued)

FOREIGN PATENT DOCUMENTS

EP         2 455 768 A1    5/2012
WO    WO 2014/160419 A1   10/2014

OTHER PUBLICATIONS

Vandernoot, Guillaume, "Characterization and Optimization of the High-Fidelity Restitution in Vehicle", 2001, Pierre and Marie Curie (Paris 6) University, English translation provided LinguaLinx Language Solutions, Inc., pp. 1-47. (Year: 2001).*

(Continued)

*Primary Examiner* — Davetta W Goins
*Assistant Examiner* — Daniel R Sellers
(74) *Attorney, Agent, or Firm* — Oblon, McClelland, Maier & Neustadt, L.L.P.

(57) ABSTRACT

At least one acoustic parameter of an environment is obtained by emitting a sound signal emitted, receiving a sound signal received, estimating a sampling frequency shift and of a temporal shift between the emission and reception devices on the basis of impulse responses obtained on the basis of portions of the sound signal received and of corresponding portions of the sound signal emitted, obtaining a corrected sound signal received by applying to the sound signal received a sampling frequency shift correction and a temporal shift correction on the basis of the estimating, determining the impulse response of the environment on the basis of portions of the corrected sound signal received and of corresponding portions of the sound signal emitted, and obtaining acoustic parameters of the environment on the basis of the impulse response.

13 Claims, 3 Drawing Sheets

(56) References Cited

U.S. PATENT DOCUMENTS

| | | | | |
|---|---|---|---|---|
| 2004/0213415 | A1* | 10/2004 | Rama | G01H 7/00 |
| | | | | 381/63 |
| 2008/0002833 | A1* | 1/2008 | Kuster | H04S 7/00 |
| | | | | 381/63 |
| 2012/0166123 | A1 | 6/2012 | Hino et al. | |
| 2016/0029142 | A1 | 1/2016 | Isaac | |

OTHER PUBLICATIONS

International Search Report dated Dec. 5, 2016 in PCT/FR2016/052144, citing documents AA-AB, AO-AP and AX-AY therein, 3 pages.

Guillaume Vandernoot, "Caractérisation et optimisation de la restitution haute-fidélité en véhicule", Thèse de doctorat de l'Université Paris 6, XP055287144, 2001, pp. 1-306 and cover pages.

Hiroshi Koide, et al., "Application of Synchronous Averaging Method in Frequency Domain for Asynchronous System to Sound Distance Measurement", AES 40th International Conference, XP040567120, 2010, pp. 1-9.

\* cited by examiner

METHOD AND SYSTEM FOR OBTAINING AT LEAST ONE ACOUSTIC PARAMETER OF AN ENVIRONMENT

BACKGROUND OF THE INVENTION

The invention lies in the technical field of the measurement of the acoustic parameters of an environment.

Various techniques for measuring impulse responses are known, in particular through the document "Comparison of different impulse response measurements techniques" by Stan Guy-Bart, Embrechts Jean-Jacques, Archambeau Dominique, Journal of the Audio Engineering Society, Volume 50 No 4 pages 249-262, April 2002.

In a known manner, these techniques make it possible to obtain an impulse response of the environment, on the basis of which it is possible to deduce quantities relating to comfort and to the acoustic performance of buildings.

Unfortunately, these techniques require complex equipment and can in practice only be implemented by qualified personnel.

They also require that the devices used to emit and receive the sound signal used for the calculation of the impulse response be mutually synchronized.

The invention envisages a method for measuring acoustic parameters of an environment which can be implemented with mass-market equipment without these heavy synchronization constraints.

SUBJECT AND SUMMARY OF THE INVENTION

For this purpose, and according to a first aspect, the invention relates to a method for obtaining at least one acoustic parameter of an environment, this method comprising:
a step of emitting a sound signal emitted by an emission device;
a step of receiving a sound signal received by at least one reception device; and for each of said reception devices:
  a step of determining the impulse response of the environment at the position of the reception device; and
  a step of obtaining an acoustic parameter of the environment on the basis of this impulse response.
This method comprises, for a given reception device:
  an estimation of a sampling frequency shift between the emission device and this reception device on the basis of at least one impulse response obtained on the basis of at least one portion of the sound signal received by this reception device and of a corresponding portion of the sound signal emitted;
  an estimation of a temporal shift between the emission device and this reception device on the basis of at least one impulse response obtained on the basis of at least one portion of the sound signal received by this reception device and of a corresponding portion of the sound signal emitted;
  the obtaining of a corrected sound signal received obtained by applying, to the sound signal received by this reception device, a sampling frequency shift correction and a temporal shift correction on the basis of these estimations;
  the determination of the impulse response of the environment being obtained on the basis of at least one impulse response obtained on the basis of at least one portion of the corrected sound signal received and of a corresponding portion of the sound signal emitted.

Thus, and in a general manner, the invention makes it possible to circumvent the temporal shift and the sampling frequency shift between the emitter device of the sound signal emitted and the receiver device of the sound signal received.

This temporal shift and this sampling frequency shift are estimated by calculating the impulse response on portions of sound signal that are chosen for this purpose.

In particular, according to the invention, an absolute temporal shift between the emission device and the reception device is estimated.

By virtue of these advantageous characteristics, the method according to the invention can be implemented by an emission device (for example an enclosure able to excite the air or a transducer able to excite a solid) and a reception device (for example a terminal) chosen independently of one another.

In a mode of implementation of the invention, it is possible to use several reception devices disposed in various locations of the environment, for example at various locations of one and the same room, on either side of a partition or of a glass pane, or on various storeys of a building, so as to assess the acoustic properties of this environment at various locations in a single measurement.

The invention can therefore in particular be implemented with "mass-market" hardware. In particular, the emission device can be a "mass-market" enclosure able to excite the air in the environment or a surface transducer able to excite a solid in the environment, in particular a wall such as a partition, a floor, a ceiling, etc. The reception device can be a "mass-market" terminal, for example a laptop or other computer, a smartphone, a tablet.

Consequently, and according to a second aspect, the invention relates to a terminal comprising:
a communication module able to dispatch a sound signal to an emission device able to play back this signal in the form of sound signal emitted in an environment;
a microphone able to receive a sound signal received;
a processing module configured to:
  determine the impulse response of the environment at the position of the terminal; and
  obtain an acoustic parameter of the environment on the basis of this impulse response.
This terminal is noteworthy in that the processing module is configured to:
  estimate a sampling frequency shift between the emission device and the terminal on the basis of at least one impulse response obtained on the basis of at least one portion of the sound signal received and of a corresponding portion of the sound signal emitted;
  estimate a temporal shift between the emission device and the terminal on the basis of at least one impulse response obtained on the basis of at least one portion of the sound signal received and of a corresponding portion of the sound signal emitted;
  obtain a corrected sound signal received by applying, to the sound signal received, a sampling frequency shift correction and a temporal shift correction on the basis of these estimations;
  determine the impulse response of the environment on the basis of at least one impulse response obtained on the basis of at least one portion of the corrected sound signal received and of a corresponding portion of the sound signal emitted.

In one embodiment, the various steps of the method for obtaining acoustic parameters are determined by computer program instructions.

Consequently, the invention also envisages a computer program on a recording medium, this program being able to be implemented in a terminal, or more generally in a computer, this program comprising instructions suitable for the implementation of the steps of a method such as mentioned hereinabove for obtaining acoustic parameters.

This program can use any programming language, and be in the form of source code, object code, or of code intermediate between source code and object code, such as in a partially compiled form.

The invention also envisages a recording medium readable by a computer, and comprising instructions of a computer program such as mentioned hereinabove.

The recording medium can be any entity or device capable of storing the program. For example, the medium can comprise a storage means, such as a read-only memory, a rewritable nonvolatile memory, for example a USB key, an SD card, an EEPROM, or else a magnetic recording means, for example a hard disk.

The recording medium can also be an integrated circuit in which the program is incorporated, the circuit being adapted to execute or to be used in the execution of the method.

The recording medium can be a transmissible medium such as an electrical or optical signal, which can be conveyed via an electrical or optical cable, by radio or by other means. The program according to the invention can be in particular downloaded on a network of Internet type.

In a particular embodiment, the processing module of the terminal according to the invention comprises a computer program such as mentioned hereinabove, this program being recorded on a recording medium in accordance with the invention and consisting of a rewritable nonvolatile memory of the terminal, the instructions of the program being interpretable by a processor of this terminal.

The terminal, the computer program and the recording medium exhibit, according to the embodiments of the invention, the same characteristics as the method according to the invention and some of which will now be presented.

In a particular embodiment, the acoustic parameters obtained by the method according to the invention are parameters defined by ISO standard 3382. These parameters can in particular be chosen from among the reverberation time T, the sound strength G, the definition D50, the clarity C80, the central time Ts, the early decay time EDT, the lateral energy LF and LFC, the sound pressure level SPL, the interaural correlation coefficient IACC. The acoustic parameters obtained by the method according to the invention can also be noise insulation parameters such as defined by ISO standard 16283-1 for airborne noise insulation and ISO standard 16283-2 for impact noise insulation.

In a particular embodiment, the sound signal emitted is a generic sound signal chosen independently of the environment. Such a sound signal can allow accurate measurements for any type of environment but optionally requires a relatively significant processing time.

As a variant, the sound signal emitted is optimized for a given environment. This characteristic of the invention makes it possible to reduce the measurement time and therefore the lag in obtaining the acoustic parameter or parameters of the environment for each of the reception devices.

Thus, in one embodiment, the invention proposes to choose an environment, for example from a predefined list, and the sound signal emitted by the emission device is chosen, optimized or generated on the basis of this choice.

An environment can for example be defined by a context comprising:

a type of site (closed room, concert hall, corridor, set of several rooms separated by partitions, open or semi-open space, etc.); and a use (individual seminar, group work, one-way course given by a teacher to students, meeting, oral presentation performed by a person in front of a screen, etc.).

In a particular embodiment, the method according to the invention comprises a preliminary step of obtaining at least one characteristic of the environment, this characteristic being taken into account so as to choose, optimize or generate the sound signal emitted. This embodiment makes it possible to refine the parametrization of this signal so as to improve the reliability of the measurements or reduce their duration but requires a more complex parametrization by the user.

A geometric dimension of the site of the measurement (surface, volume, etc.), the distance between the emission device and the reception device can constitute such characteristics of the environment.

In a particular embodiment, the method according to the invention comprises a step of cutting the sound signal received by the reception device so as to isolate the signal portions used for the various processings (estimation of the sampling frequency shift, estimation of the temporal shift, calculation of the impulse response of the environment). This cutting can be performed on the basis of the corresponding portions of the sound signal emitted which is stored in the library of the terminal.

This characteristic makes it possible to improve the quality of these various processings.

In a particular embodiment of the method according to the invention, the estimation of the sampling frequency shift between the emission device and a reception device comprises the obtaining of a first estimation of this shift by a maximization, by varying the sampling frequency of the sound signal received, of the maximum amplitude of the impulse response obtained on the basis of a portion of the sound signal emitted and of a corresponding portion of the sound signal received.

In a particular embodiment of the method according to the invention, the estimation of the sampling frequency shift between the emission device and a reception device comprises a refinement of the first estimation on the basis of a comparison, for several successive portions of the sound signal emitted, between:

on the one hand, the position of the maximum amplitude of the impulse response obtained on the basis of the portion of the sound signal emitted and of a corresponding portion of the sound signal received re-sampled at the sampling frequency corresponding to the aforementioned maximization, and on the other hand, the position of the maximum amplitude of the ideal impulse response obtained on the basis of the portion of the sound signal emitted and of a theoretical sound signal received identical to this portion of the sound signal emitted.

In a particular embodiment, this ideal impulse response is obtained by autocorrelation of said portion of the signal emitted.

In a particular embodiment of the method according to the invention, the estimation of the temporal shift between the emission device and a reception device is obtained on the basis of a comparison, for at least one portion of the sound signal emitted, between:

on the one hand, the position of the maximum amplitude of the impulse response obtained on the basis of the portion of the sound signal emitted and of a corresponding portion of the sound signal received, and on the other hand, the position of the maximum amplitude of the ideal impulse response obtained on the basis of the portion of the sound signal emitted and of a theoretical sound signal received identical to this portion of the sound signal emitted.

In a particular embodiment of the method according to the invention, the estimation of the temporal shift between the emission device and a reception device is obtained on the basis of a comparison, for at least one portion of the sound signal emitted, between:

on the one hand, the position of the maximum amplitude of the impulse response obtained on the basis of the portion of the sound signal emitted and of a corresponding portion of the sound signal received resampled at the sampling frequency corresponding to the aforementioned maximization, and on the other hand, the position of the maximum amplitude of the ideal impulse response obtained on the basis of the portion of the sound signal emitted and of a theoretical sound signal received identical to this portion of the sound signal emitted.

In a particular embodiment of the method according to the invention comprises a step of deleting invalid sequences of the corrected sound signal received, these invalid sequences corresponding to losses of packets of the sound signal emitted.

In a particular embodiment of the method according to the invention, the sequences considered invalid are those lying between two consecutive predetermined portions of the corrected sound signal received and separated from one another by a duration deviating beyond a threshold from a presumed duration.

In a particular embodiment of the method according to the invention, the sound signal emitted comprises signal portions which form temporal tags, and invalid sequences of the corrected sound signal received are identified by comparing:

the duration between two consecutive tags for the impulse response obtained on the basis of at least one portion of the sound signal emitted comprising these two tags and of a corresponding portion of the corrected sound signal received, and the duration between these two consecutive tags for the sound signal emitted.

In a particular embodiment of the method according to the invention, the impulse response of the environment is calculated on the basis of at least one portion of the corrected sound signal received in which the invalid sequences have been deleted and of a corresponding portion of the sound signal emitted in which the sequences corresponding to the invalid sequences have been deleted.

In a particular embodiment, the sound signal emitted comprises at least one portion comprising the repetition of at least one sequence, said impulse response of the environment being obtained by performing:

the calculation of the impulse response on the basis of each of these sequences and of the corresponding sequences of the sound signal received;

the average of these impulse responses within each of said portions; and then the average of these averages for all the portions.

This characteristic makes it possible advantageously to resolve or decrease the effects of non-linearity problems.

In a particular embodiment, the portions of the sound signal emitted comprise at least one sequence chosen from among:

an MLS sequence ("Maximum Length Sequence");
an IRS sequence ("Inverse Repeated Sequence");
a TSP sequence ("Time-Streched Pulses");
a "Logarithmic SineSweep" sequence.

In a particular embodiment, to obtain an impulse response on the basis of a portion of sound signal received and of a corresponding portion of sound signal emitted, an exact deconvolution scheme suitable for the type of sequence present in the portion of sound signal emitted is chosen. By "exact deconvolution scheme suitable for the type of sequence" is meant a scheme which, for the type of sequence considered, involves an exact inverse mathematical operation, such as in particular: a circular intercorrelation in the case of MLS or IRS sequences; a compression filter in the case of TSP sequences; an inverse filter in the case of Logarithmic SineSweep sequences. The choice of an exact deconvolution scheme suitable for the type of sequence present in the portion of sound signal emitted guarantees that an exact impulse response will be obtained, this not being the case for approximate schemes such as iterative schemes for fitting between a sound signal emitted and a sound signal received. This results in good reliability of the method according to the invention.

In an advantageous embodiment, that portion of the sound signal emitted which is used to allow a first estimation of the sampling frequency shift and/or a first estimation of the temporal shift between the emission device and a reception device comprises at least one sequence chosen from among an MLS sequence ("Maximum Length Sequence") and an IRS sequence ("Inverse Repeated Sequence"). The use of such MLS or IRS sequences has the advantage of allowing estimation of the sampling frequency shift and/or of the temporal shift by analyzing a single sequence of the sound signal emitted, that is to say without having to average over several sequences, even when the level of the sound signal emitted by the emission device is less than that of the background noise (the sequence being chosen with a sufficient duration).

The invention also relates to a system for obtaining at least one acoustic parameter of an environment, this system comprising:

an emission device for emitting a sound signal emitted;
at least one reception device for receiving a sound signal received;
a module for determining the impulse response of the environment; and
a module for obtaining an acoustic parameter of the environment on the basis of this impulse response.

The system according to the invention is noteworthy in that it comprises:

a module for estimating a sampling frequency shift between the emission device and said reception device on the basis of at least one impulse response obtained on the basis of at least one portion of the sound signal received and of a corresponding portion of the sound signal emitted;

a module for estimating a temporal shift between the emission device and said reception device on the basis of at least one impulse response obtained on the basis of at least one portion of the sound signal received and of a corresponding portion of the sound signal emitted;

a module for obtaining a corrected sound signal received obtained by applying, to the sound signal received by this reception device, a sampling frequency shift correction and a temporal shift correction on the basis of said estimations;

the module for determining the impulse response of the environment being configured to determine said impulse response of the environment on the basis of at least one impulse response obtained on the basis of at least one portion of the corrected sound signal received and of a corresponding portion of the sound signal emitted.

The particular characteristics and advantages of the system according to the invention are identical or similar to those of the method according to the invention and will not be recalled here.

In a particular embodiment, the various modules of the system are incorporated in the device for receiving the sound signal received.

As a variant, these modules can be implemented in another item of equipment, for example in a computer linked to the reception device by a communication network. In this variant, the reception device transmits the sound signal received to this remote item of equipment which is in charge of all the calculations necessary for determining the acoustic parameters of the environment. For this purpose, it is necessary that this item of equipment obtains beforehand the characteristics of the signal emitted, either from this reception device, or for example from a database.

BRIEF DESCRIPTION OF THE DRAWINGS

Other characteristics and advantages of the present invention will emerge from the description given hereinbelow, with reference to the drawings and to annex 1 which illustrate an exemplary embodiment thereof devoid of any limiting character and in which.

DETAILED DESCRIPTION OF A FIRST EMBODIMENT

Figure 1:
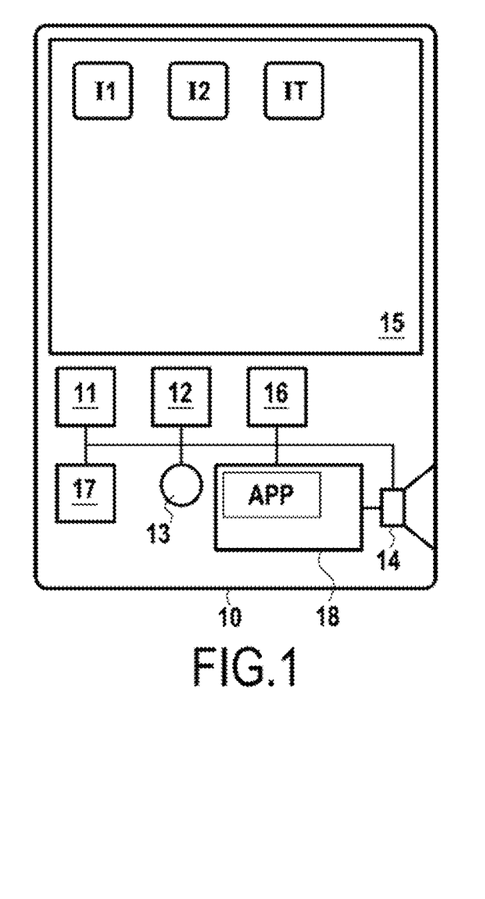
FIG. 1 represents a terminal in accordance with the invention in a particular embodiment.

FIG. 1 represents in a schematic manner a terminal 10 in accordance with a particular embodiment of the invention. In this example, this terminal consists of a smartphone, offering the user, beyond telephone functions, and more generally communication functions, access to diverse applications as soon as the latter have been installed in the terminal.

From a hardware point of view, this terminal comprises in particular a processor 11, a read-only memory of ROM type 12 in which are recorded system functions, especially drivers and the operating system of the terminal, a microphone 13, a loudspeaker 14, a screen 15, a sound card 16, one or more communication modules (3G, 4G, Bluetooth, WiFi, etc.) 17 and a rewritable nonvolatile memory 18 comprising applications APP and user data that are not represented in this figure, these elements being linked together by a bus system.

In a known manner, the screen 15 constitutes a man-machine touch interface on which are represented icons I1, I2, IT, corresponding to the system applications and to the various applications APP installed by the user of the terminal.

Among these icons, an icon IT allows the terminal to access remotely, via a telecommunications network, a portal of downloadable applications compatible with the operating system of the terminal and to install, optionally via payment and/or authentication, new applications APP in the rewritable nonvolatile memory 18.

In the embodiment described here, a computer program PG in accordance with the invention can be downloaded from this applications portal, and an associated icon presented on the touch interface 15.

Figure 2:
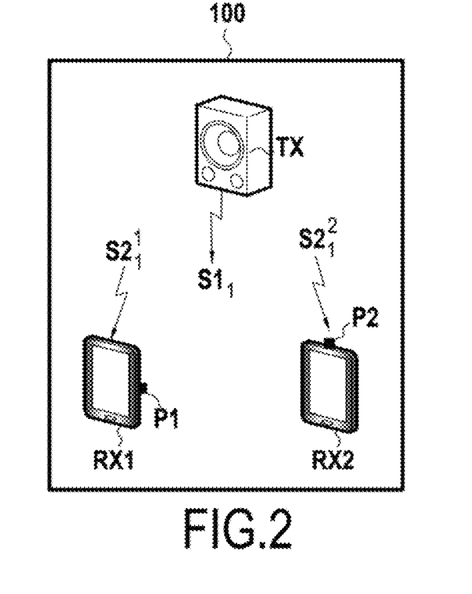
FIG. 2 represents, in a schematic manner, a first exemplary implementation of the invention in a particular measurement environment.

With reference to FIG. 2, we will assume in this example that a user possessing two terminals RX1, RX2 that are identical or similar to the terminal 10 of FIG. 1 in respect of the functional parts in common with the latter (reception devices within the meaning of the invention), desires to assess in a single measurement, the acoustics of an environment 100 in two locations, this environment consisting in this example of a classroom comprising a podium and several rows of desks facing this podium.

If this has not already been done, the user downloads and installs the computer program PG in the nonvolatile memory 18 of each of the terminals RX1, RX2, positions these terminals at the positions P1, P2 and places an enclosure TX (emission device within the meaning of the invention) at the level of the podium.

This enclosure TX comprises communication means, not represented, compatible with those of the terminals RX1, RX2 so as to be able to receive from one of these terminals a sound signal $S1_k$ to be played back in the form of a sound signal emitted in the environment 100. In this example, the enclosure TX is an autonomous enclosure comprising in a conventional manner a loudspeaker, a battery, a power management circuit, a wireless connectivity module, a digital-analog converter, an audio amplifier.

Figure 3:
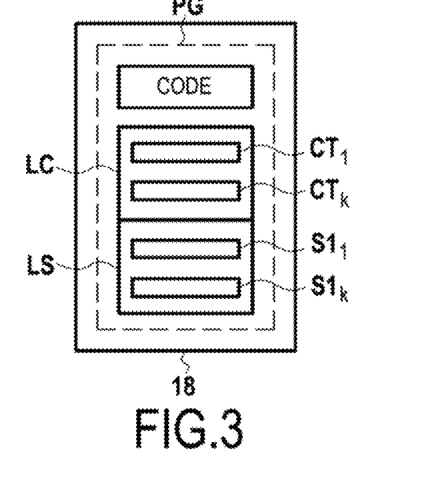
FIG. 3 represents a memory of a terminal in accordance with a particular embodiment of the invention.
Figure 5:
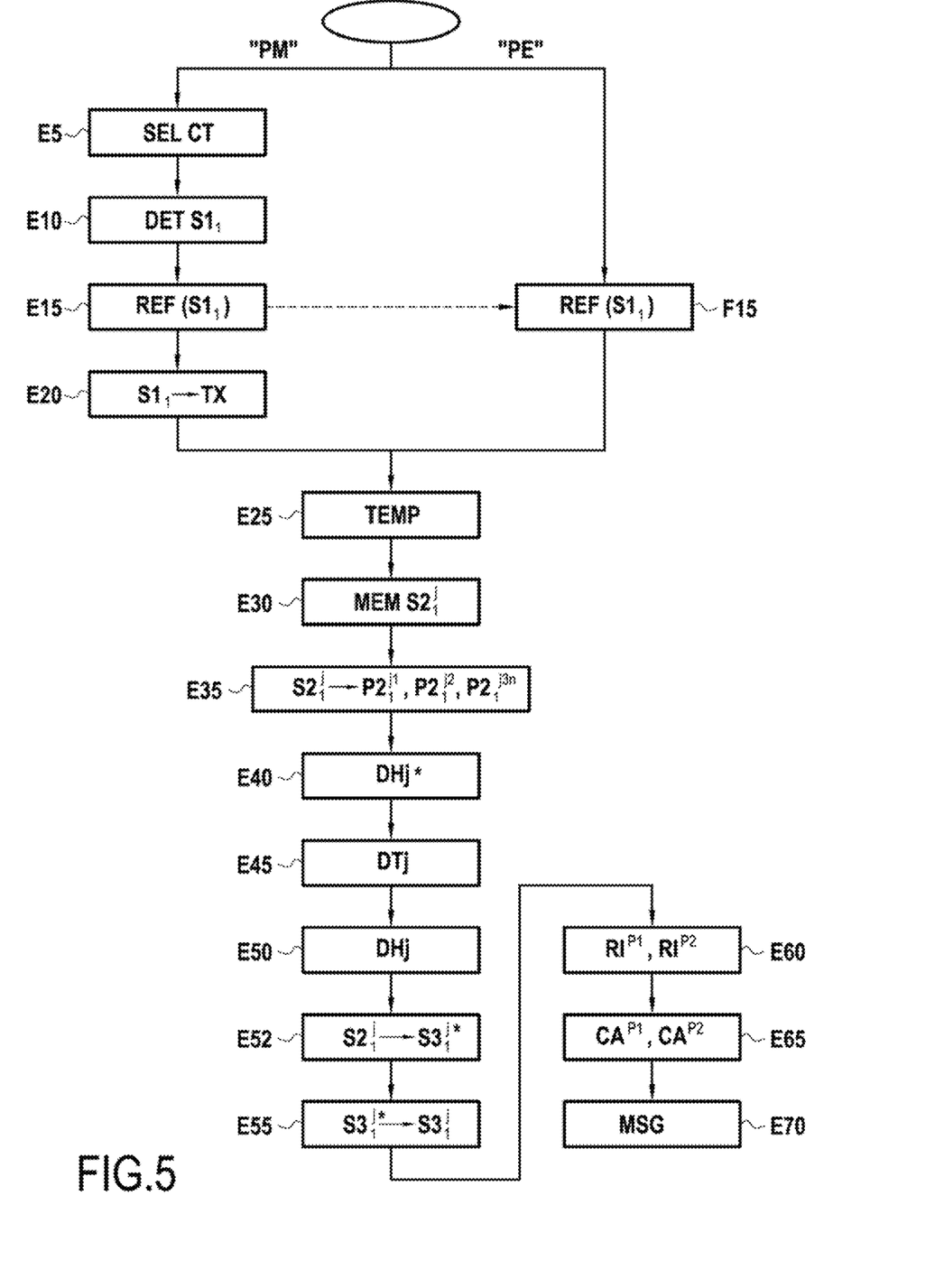
FIG. 5 represents, in the form of a flowchart, the main steps of a method for obtaining acoustic parameters of an environment in a particular embodiment of the invention.

FIG. 3 represents a part of the nonvolatile memory 18 of each of the terminals RX1, RX2 after installation of the computer program PG. This memory comprises:

- a part "CODE" corresponding to the instructions, compiled or otherwise, of the computer program PG and interpretable by the processor 11, these instructions making it possible to implement steps E5 to E70 of the method according to the invention and represented in FIG. 5;
- a library "LC" of contexts $CT_k$ selectable by the user via the man-machine interface 15 of the terminal, each measurement context being defined by a pair {type of environment/use}; and
- a library "LS" of predefined or parametrizable sound signals $S1_k$ associated with these contexts.

In the embodiment described here, updates of the computer program PG can be downloaded from the portal and installed in the memory 18, for example when new contexts $CT_k$ or new sound signals $S1_k$ are available.

We will assume in this example that the computer program PG offers two modes of operation referenced "Master"/"Slave", respectively implemented by the terminals RX1, RX2 in the example described here, and in which:

the "Master" mode allows the terminal RX1 to choose a context $CT_1$ in the library LC via the interface 15, to determine a sound signal hereinafter referenced $S1_1$ associated with this context in the library of sounds LS, to dispatch the reference of this sound signal to the terminals RX2 in "Slave" mode by communication means 17, to dispatch the sound signal to the enclosure TX by communication means 17 so that the enclosure plays it back in the form of a sound signal emitted $S1_1$ in the environment, to control the capture of a sound signal received $S2_1^1$ by the microphone 13 after a predetermined timeout, to record this sound signal received $S2_1^1$ in the nonvolatile memory 18 by the sound card 16, to determine acoustic parameters $CA^{P1}$ of the environment at the position P1 of the terminal RX1 on the basis of the sound signal emitted $S1_1$ by the enclosure TX and of the sound signal received $S2_1^1$, and to present an information message MSG to the user of the terminal generated on the basis of these parameters;

the mode "Slave" allows the terminal RX2, to receive, from a "Master" terminal RX1, the reference of a sound signal $S1_1$ by the communication means 17, to control the capture of a sound signal received $S2_1^2$ by the microphone 13 after a predetermined timeout, to record this sound signal received $S2_1^2$ in the nonvolatile memory 18 by the sound card 16, to determine acoustic parameters $CA^{P2}$ of the environment at the position P2 of the terminal RX2 on the basis of the sound signal emitted $S1_1$ emitted by the enclosure TX and of the sound signal received $S2_1^2$ and to present an information message MSG to the user of the terminal, generated on the basis of these parameters.

In a general manner, the emitted sound signals $S1_k$ are preferentially sound signals having a non-negligible spectral density for all the frequencies lying between 10 Hz and 22050 Hz and exhibiting good autocorrelation properties. In particular, the emitted sound signals $S1_k$ are noise, such as white noise or pink noise.

By way of example, it is possible to consider:
that a sound signal exhibits a non-negligible spectral density for all the frequencies lying between 10 Hz and 22050 Hz when each frequency in this range exhibits a spectral density of greater than 10% of the maximum spectral density; and
that a sound signal exhibits good autocorrelation properties when it exhibits a very pronounced autocorrelation peak, in particular the value of the autocorrelation at times greater than 0.1 s is less than 2%, preferably less than 1%, more preferably less than 0.5% of the value of the autocorrelation at 0 s.

Figure 4:
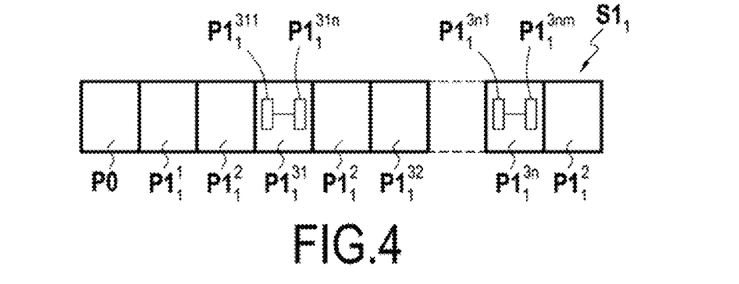
FIG. 4 represents an exemplary sound signal that may be used in a particular embodiment of the invention.

In the embodiment described here, and as described with reference to FIG. 4, the sound signal emitted $S1_1$ comprises, after a filling header P0 (or "padding bits"), a first portion $P1_1^1$, and then third portions $P1_1^{3n}$ bracketed by second portions or "tags" $P1_1^2$.

Each of these portions $P1_1^1$, $P1_1^2$, $P1_1^{3n}$ must be chosen to be of sufficiently long duration with respect to the presumed reverberation time of a sound signal in the environment 100.

The first portion $P1_1^1$ is in this example used to allow:
a first estimation DHi* of the sampling frequency shift DHi; and
an estimation of the temporal shift DTi,
between the emission device TX and each of the reception devices RXi.

This first portion $P1_1^1$ is longer than the estimated temporal shift between the emission device TX and each of the reception devices RXi, typically of the order of 2 seconds.

The second portions or tags $P1_1^2$ of the sound signal emitted $S1_1$ make it possible, in this embodiment:
to refine the estimation DHi* of the sampling frequency shift DHi; and
to detect possible packet losses which could falsify the impulse responses which will be obtained on the basis of the third portions $P1_1^{3n}$.

The second portions $P1_1^2$ are a set of MLS sequences of shorter durations.

In the embodiment described here, each third portion $P1_1^{3n}$ consists of the repetition of at least one sequence $P1_1^{3nm}$, so as to resolve or decrease the effects of non-linearity problems. The duration of each of the third portions $P1_1^{3n}$ must be considerably greater than the reverberation time in the environment 100 in order for the measurements to be accurate.

With reference to FIG. 5, we shall now describe the method implemented by each of the terminals RX1, RX2 in this particular embodiment.

In the mode of embodiment described here, the computer program PG comprises two processes, a process PM corresponding to the "Master" mode executed by the terminal RX1 and a process PE corresponding to the "Slave" mode executed by the terminal RX2.

In the course of a step E5, the user selects on the man-machine interface 15 of the terminal RX1 a context $CT_1$ "Classroom" from the library of contexts LC of this terminal.

In the course of a step E10, the processor 11 of the terminal RX1 determines a sound signal $S1_1$ associated with this context in the library LS of sound signals.

In the course of a step E15, the terminal RX1 dispatches, by wireless communication means 17, the reference of the sound signal $S1_1$ to the terminal RX2. The terminal RX2 receives this reference in the course of a step F15.

In the course of a step E20, the "Master" terminal RX1 dispatches the sound signal $S1_1$ to the enclosure TX so that the latter plays it back in the form of a sound signal emitted $S1_1$ in the environment 100.

In the embodiment described here, the method implemented by the Master RX1 and Slave RX2 terminals (hereinafter RXj) is thereafter identical.

In the course of a step E25, the terminals RXj wait a predetermined duration before beginning to record the sound signal received $S2_1^j$. This duration allows in particular the processing of step F15 by the terminal RX2 and the configuration of the microphone 13 and of the sound card 16 at reception for each of the terminals. The duration of the header P0 of the sound signal emitted $S1_1$ is chosen so that the terminals RXj actually begin to record the sound signal received $S2_1^j$ before the enclosure TX plays back the first portion of the sound signal emitted $P1_1^1$.

In the embodiment described here, the sampling frequency $f_{TX}$ of the emission device TX is 44100 Hz.

In practice, and as is known to a person skilled in the art, the analog sound signal to be emitted is processed by the processor or a component of the emission device TX, so as to obtain a table of values whose interval corresponds to this frequency $f_{TX}$ and which defines, for each instant $t_i$, an integer value corresponding to the discretized amplitude $A_i$ having to be dispatched at the instant $t_i$ to the loudspeaker of the device TX to make it vibrate.

Each of the terminals RXj stores the sound signal received $S2_1^j$ that it receives in the course of a step E30 in its rewritable nonvolatile memory 18.

Calling $f_{RXj}$ the sampling frequency of the reception device RXj, the processor 11 or the sound card 16 of this device constructs a table of values whose interval corresponds to this frequency $f_{RXj}$ and which defines, for each instant t, an integer value corresponding to the discretized amplitude A(t) of the sound signal received $S2_1^j$ by the microphone of the device $RX_j$ at the instant t.

In the embodiment described here, in the course of a step E35, the sound signal received $S2_1^j$ is cut up into portions $P2_1^{j1}$, $P2_1^{j2}$, $P2_1^{j3n}$ corresponding to the portions $P1_1^1$, $P1_1^2$, $P1_1^{3n}$ of the sound signal emitted $S1_1$.

In the course of a step E40, the processor 11 of the terminal RXj performs a first estimation DHj* of the sampling frequency shift DHj between the emission device TX and the reception device RXj.

This step consists in particular in maximizing, by varying the sampling frequency of the sound signal received (for example between 44000 Hz and 44100 Hz), the maximum amplitude of the impulse response obtained on the basis of the first portion $P1_1^1$ of the sound signal emitted $S1_1$ and of the corresponding first portion $P2_1^{j1}$ of the sound signal received $S2_1^j$.

The sampling frequency of the sound signal received $S2_1^j$ making it possible to obtain this maximum amplitude, which corresponds to a first estimation DHj* of the sampling frequency shift DHj, is stored in the course of this step E40.

This first estimation DHj* of the sampling frequency shift produces, by re-sampling of the sound signal received, a new table of values $T2_j^*$, for example by linear interpolation of the values of the table of values $T2_j$.

In the course of a step E45, the processor 11 of the terminal RXj estimates the temporal shift DTj between the emission device TX and the reception device RXj.

This step of estimating the temporal shift DTj consists in particular, in this embodiment, in comparing:
- on the one hand, the position of the maximum amplitude of the impulse response obtained on the basis of the first portion $P1_1^1$ of the sound signal emitted $S1_1$ and of the corresponding first portion $P2_1^{j1*}$ of the sound signal received $S2_1^j$ re-sampled at the sampling frequency stored in step E40, and
- on the other hand, the position of the maximum amplitude of the ideal impulse response obtained on the basis of the first portion $P1_1^1$ of the sound signal emitted $S1_1$ and of a theoretical sound signal received identical to this first portion $P1_1^1$.

The temporal disparity between these two positions, which corresponds to an estimation of the temporal shift DTj, is stored in the course of this step E45.

In the course of a step E50, the processor 11 of the terminal RXj refines the first estimation DHj* of the sampling frequency shift DHj between the emission device TX and the reception device RXj.

This step E50 is advantageously carried out after having corrected the temporal shift DTj stored in step E45, that is to say after having temporally shifted the whole of the signal received $S2_1^j$ so as to bring the maximum amplitude of the impulse response obtained on the basis of the first portion $P1_1^1$ of the sound signal emitted $S1_1$ and of the corresponding first portion $P2_1^{j1*}$ of the sound signal received $S2_1^j$ into correspondence with the position of the maximum amplitude of the ideal impulse response obtained on the basis of the first portion $P1_1^1$ of the sound signal emitted $S1_1$ and of a theoretical sound signal received identical to this first portion $P1_1^1$.

Step E50 then consists in particular, in this embodiment, in comparing for the various successive second portions or tags $P1_1^2$ of the sound signal emitted $S1_1$:

- on the one hand, the position of the maximum amplitude of the impulse response obtained on the basis of the second portion $P1_1^2$ of the sound signal emitted $S1_1$ and of the corresponding second portion $P2_1^{j2*}$ of the sound signal received $S2_1^1$ re-sampled at the sampling frequency stored in step E40, and
- on the other hand, the position of the maximum amplitude of the ideal impulse response obtained on the basis of the second portion $P1_1^2$ of the sound signal emitted $S1_1$ and of a theoretical sound signal received identical to this second portion $P1_1^2$.

If the temporal disparity between these two positions evolves over the various successive second portions or tags $P1_1^2$ of the sound signal emitted $S1_1$, the estimation of the sampling frequency shift DHj can be refined by determining the sampling frequency for which a homogeneous temporal disparity is obtained between said two positions for all the successive second portions or tags $P1_1^2$ of the sound signal emitted $S1_1$.

The sampling frequency of the sound signal received $S2_1^j$ making it possible to obtain this homogeneous temporal disparity for all the successive second portions or tags $P1_1^2$, which corresponds to a refined estimation of the sampling frequency shift DHj, is stored in the course of this step E50.

In the course of this step E50, once the aforementioned temporal disparity is homogeneous for all the successive second portions or tags $P1_1^2$, it is also possible to refine the estimation of the temporal shift DTj between the emission device TX and the reception device RXj, by temporally shifting the whole of the signal received $S2_1^j$ so as to bring the maximum amplitude of the impulse response obtained on the basis of each second portion $P1_1^2$ of the sound signal emitted $S_1$ and of the corresponding second portion $P2_1^{j2*}$ of the sound signal received $S2_1^j$ into correspondence with the position of the maximum amplitude of the ideal impulse response obtained on the basis of each second portion $P1_1^2$ of the sound signal emitted $S1_1$ and of a theoretical sound signal received identical to this second portion $P1_1^2$.

In the course of a step E52, a sampling frequency shift correction and a temporal shift correction are applied to the sound signal received $S2_1^j$ on the basis of the previously obtained estimations of the sampling frequency shift DHj and of the temporal shift DTj, so as to produce a corrected sound signal received $S3_1^{j*}$ within the meaning of the invention.

In the embodiment described here, the method according to the invention also comprises a step E55 of deleting invalid sequences of the corrected sound signal received $S3_1^{j*}$, these invalid sequences corresponding to losses of packets of the sound signal emitted $S1_1$.

In the embodiment described here, this detection is performed by verifying that the duration between two consecutive tags for the impulse response obtained on the basis of at least one portion of the sound signal emitted $S1_1$ comprising these two tags and of a corresponding portion of the corrected sound signal received $S3_1^{j*}$, is substantially equal to the duration between the corresponding two tags $P1_1^2$ for the sound signal emitted $S1_1$.

When a duration between two consecutive tags for the impulse response deviates from the duration between the corresponding two tags $P1_1^2$ for the sound signal emitted $S1_1$ beyond a predetermined threshold, it is considered that packets have been lost between these tags; the corresponding third portions of sound signal emitted $P1_1^{3n}$ and $P2_1^{j3n}$ lying between these tags are eliminated both in the sound signal emitted $S1_1$ and in the corrected sound signal received $S3_1^j$.

The corrected sound signal received $S3_1^{j*}$ cleaned of these lost packets is denoted $S3_1^j$.

It is recalled that, in this example, a third portion $P1_1^{3n}$ of the sound signal emitted $S1_1$, lying between two tags $P1_1^2$, consists of the repetition of at least one MLS sequence $P1_1^{3nm}$.

In the embodiment described here, in the course of a step E60, the impulse response is calculated on the basis of each of these sequences $P1_1^{3nm}$, $P2_1^{j3nm}$, the average of these impulse responses within the third portion $P1_1^{3n}$ is calculated for all the values of m, and then finally the average of these averages is calculated for all the values of n, stated otherwise for the set of third portions $P1_1^{3n}$, $P2_1^{j3n}$ of the sound signals $S1_1$, $S3_1^j$.

The impulse response $RI^{Pj}$ of the environment 100 at the position of the reception device RXj ($RI^{P1}$, $RI^{P2}$ in this example) is thus obtained.

This impulse response makes it possible to calculate, in the course of a step E65, one or more parameters $CA^{Pj}$ of the environment, for example acoustic parameters such as recalled previously defined by ISO standard 3382.

In the particular embodiment described here, the method according to the invention comprises an expert system configured to produce, on the basis of this or these acoustic parameters, an information message relating to acoustic comfort, this message being explicit for a user who is not a specialist in acoustics. This message can for example inform the user about the comfort of the environment under certain conditions (sensitivity to noise from traffic, to nearby noise, etc.).

This message is played back by the man-machine interface 15 of the terminal in the course of a step E70.

In an advantageous manner, the method and the system according to the invention can also comprise a module configured to provide a user, on the basis of the data harvested about the environment and of the environment's acoustic parameters determined according to the invention, with a simulation of modified acoustic comfort after changing the insulation of the environment, in particular after renovation.

Second Embodiment

In the first embodiment described hereinabove, the emission device is an enclosure TX able to excite the air in the environment 100. More precisely, the sound signal emitted $S1_1$ is generated in the air by a membrane of the enclosure and propagates initially in the air, and then possibly in certain solids of the environment (partitions, floors, etc.), as far as the reception devices RX1, RX2.

Figure 6:
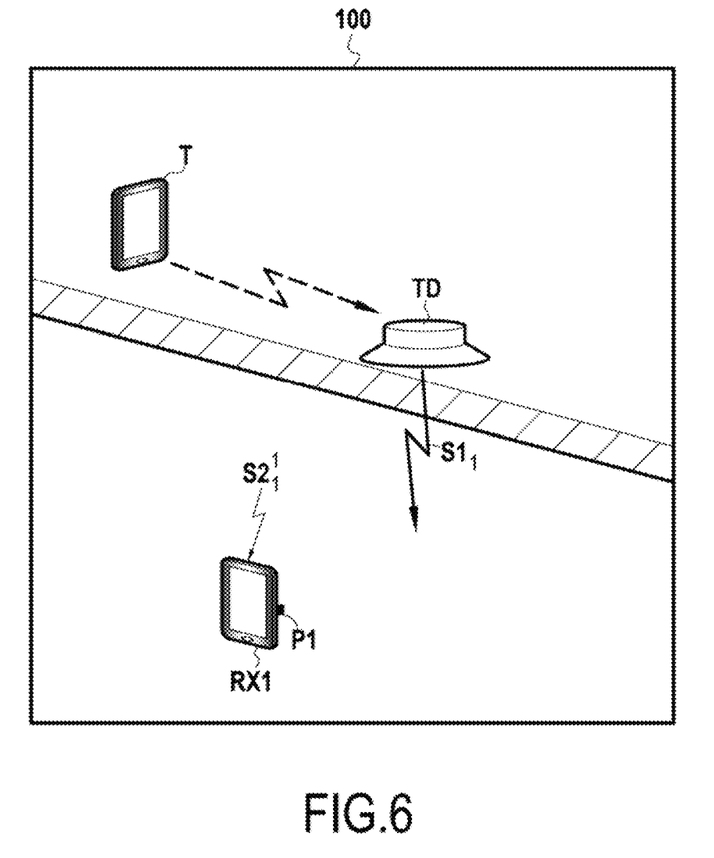
FIG. 6 represents, in a schematic manner, a second exemplary implementation of the invention in a particular measurement environment; and annex 1 provides an exemplary sound signal emitted that may be used in a particular embodiment of the invention.

As a variant, in the second embodiment represented in FIG. 6, the emission device is a surface transducer TD able to excite a solid which it is adjoining in the environment 100. In particular, in the example represented in FIG. 6, the transducer TD is adjoining a floor of a first room of the environment 100. The signal emitted generated by the transducer TD in the solid with which it is associated (here the floor) is a sound signal within the meaning of the invention. This sound signal emitted $S1_1$ propagates initially in the solid (floor), then in the air, and then possibly in other solids of the environment, as far as one or more reception devices.

In the example of FIG. 6, the sound signal propagates in particular as far as a reception device RX1 positioned at a position P1 in a second room of the environment 100, situated under the floor excited by the transducer TD. Such an arrangement can make it possible to evaluate the structure-borne noise transmission through a partition (the floor in the example of FIG. 6), and to thus determine the properties of this partition in respect of impact noise insulation.

In the example of FIG. 6, the transducer TD receives the sound signal to be emitted from a terminal T positioned in the first room, where the transducer TD is installed on the floor of this first room. The transducer TD comprises communication means, not represented, compatible with those of the terminal T, wireless communication means in particular, so as to be able to receive from this terminal a sound signal to be played back in the form of a sound signal emitted $S1_1$ in the environment 100. In this example, the transducer TD is an autonomous device comprising in a conventional manner a vibrator, a battery, a power management circuit, a wireless connectivity module, a digital-analog converter, an audio amplifier. Moreover, the terminal T positioned in the first room and the reception device RX1 positioned in the second room are each identical or similar to the terminal 10 of FIG. 1 in respect of the functional parts in common with the latter.

In the course of a step analogous to step E5 of FIG. 5, the user selects on the man-machine interface 15 of the terminal T positioned in the first room a context "Rooms separated by a floor" from the library of contexts LC of this terminal and, in the course of a step analogous to step E10 of FIG. 5, the processor 11 of the terminal T determines a sound signal associated with this context in the library LS of sound signals. In the course of a step analogous to step E15, the terminal T dispatches thereafter, by wireless communication means 17, the reference of the sound signal $S1_1$ to the terminal RX1. The terminal RX1 receives this reference in the course of a step analogous to step F15. Thereafter, in the course of a step analogous to step E20 of FIG. 5, the terminal T dispatches the sound signal to the transducer TD so that the latter plays it back in the form of a sound signal emitted $S1_1$ in the floor of the first room. The following steps of the method implemented by the terminal RX1 for receiving the sound signal received $S2_1^1$ positioned in the second room situated under the floor is identical to that detailed previously with reference to FIG. 5, comprising steps E25 to E70.

Third Embodiment

In the embodiments described hereinabove, the user selects a measurement context from a predefined list of the man-machine interface 15.

As a variant, in a third embodiment, the man-machine interface can present a more advanced menu, for example in an "expert" mode, allowing the user to define parameters of the environment, for example relating to the geometry (surface, volume) of the environment, to its structure (types of materials), or to the distance between the emission device TX, TD and the reception device or devices RX.

In this third embodiment, the sound signal emitted $S1_k$ is optimized as a function of these parameters of the environment.

Fourth Embodiment

In a fourth embodiment, the method comprises a step of filtering the sound signal emitted $S1_k$ and a corresponding step of filtering the corrected sound signal received $S3_k^j$.

These steps can respectively be implemented after steps E10 and E55 of the method of FIG. 5. When this filtering step is performed, the Master terminal informs the Slave terminal thereof in the message dispatched in step E15.

This filtering can in particular make it possible, by eliminating certain frequencies, to optimize the duration of the measurement and to render the sound signal emitted $S1_k$ more pleasant for the user by eliminating frequencies that are annoying to a human.

Fifth Embodiment

In a fifth embodiment, the method differs from that of the first embodiment in that step E50 of refining the first estimation DHj* of the sampling frequency shift DHj between the emission device TX and the reception device RXj is implemented directly after the first estimation DHj* of the sampling frequency shift, without passing via the step of estimating the temporal shift DTj. Stated otherwise, step E50 of refining the first estimation DHj* of the sampling frequency shift is implemented without prior correction of the temporal shift DTj.

This fifth embodiment requires, however, that the successive second portions or tags $P1_1^2$ of the sound signal emitted $S1_1$ be longer than the temporal shift DTj, so that an overlap exists between each second portion $P1_1^2$ of the sound signal emitted $S1_1$ and the corresponding second portion $P2_1^{j2*}$ of the sound signal received $S2_1^j$ re-sampled at the sampling frequency stored in step E40.

The invention is not limited to the examples described and represented.

In particular, in the first embodiment, two reception devices RX1 and RX2 are provided so as to determine acoustic parameters of the environment at two distinct positions. As a variant, a method and a system according to the invention can involve the reception of a sound signal received by a single reception device, in particular a single terminal which executes the steps of the process PM corresponding to the "Master" mode such as described previously, with the exception of step E15 of transmitting the reference of the sound signal $S1_1$ to another reception device since in this case there is only a single reception device.

Moreover, in the first embodiment described with reference to FIG. 2, the emission device TX is an autonomous enclosure. As a variant, the emission device TX can be a terminal which is identical or similar to the terminal 10 of FIG. 1 in respect of the functional parts in common with the latter, which emits the signal emitted $S1_1$ by way of its loudspeaker 14.

Moreover, in the case where several reception devices RXj are provided so as to determine acoustic parameters of the environment at distinct positions Pj, the method and the system according to the invention can be configured to present to the user on a central terminal (for example the "Master" terminal in the first embodiment) a single message which can comprise the set of local parameters $CA^{Pj}$ of the environment, optionally one or more characteristic global parameters of the environment, and optionally an information message relating to acoustic comfort such as mentioned previously.

Finally, the method and the system according to the invention can be implemented to obtain at least one acoustic parameter in various types of environment, for example in a building or in a vehicle.

Annex 1

This annex provides the characteristics of a signal emitted $S1_1$ that is usable in a particular embodiment of the invention.

In this example, each portion $P1_1^k$ of the sound signal emitted $S1_1$ is composed of one or more sequences of maximum length of a linear feedback shift register of maximum length, also called a Maximum Length Sequence (MLS).

For a description of the properties of these sequences, as well as for the way of generating them, the person skilled in the art will be able to refer to the document "Shift register sequences", Solomon Wolf Golomb, Holden-Day, 1967.

These sequences are characterized by a so-called "characteristic" polynomial, knowledge of which makes it possible to generate a unique sequence. Hereinafter, each polynomial will be characterized by a list of its non-zero degrees.

For example, the polynomial $x^5+x^4+x^2+1$ will be represented by [5, 4, 2, 0].

For a sequence of degree n (maximum degree of the characteristic polynomial), its length will be $2^n-1$. A sequence will then consist of a string of size $2^n-1$ of 0s and 1s.

In order to generate a sound signal, it is preferable (but not necessary) to multiply all the elements of this sequence by 2 and to deduct 1 from them, so as to obtain a string of −1 and 1s.

An exemplary sequence typically used to determine the acoustic characteristics of an average room such as an office, consists of the following successive signal portions:

Portion P0: empty

Portion $P1_1^1$: string of 2 MLS sequences generated with [15, 14, 0]. In this particular case, each bit of the sequence is repeated 4 times: 001011->0000 0000 1111 0000 1111 1111

Portion $P1_1^2$: string of 5 MLS sequences generated with [13, 12, 11, 8, 0].

Portion $P1_1^{31}$: string of 5 MLS sequences such that:
  Portion $P1_1^{311}$: 1 MLS sequence generated with [16, 15, 13, 4, 0].
  Portion $P1_1^{312}$: 1 MLS sequence generated with [16, 15, 12, 10, 0].
  Portion $P1_1^{313}$: 1 MLS sequence generated with [16, 15, 12, 1, 0].
  Portion $P1_1^{314}$: 1 MLS sequence generated with [16, 15, 10, 4, 0].
  Portion $P1_1^{315}$: 1 MLS sequence generated with [16, 15, 9, 6, 0].

Portion $P1_1^2$: string of 5 MLS sequences generated with [13, 12, 11, 8, 0].

Portion $P1_1^{32}$: string of 5 MLS sequences such that:
  Portion $P1_1^{321}$: 1 MLS sequence generated with [16, 15, 9, 4, 0].
  Portion $P1_1^{322}$: 1 MLS sequence generated with [16, 15, 7, 2, 0].
  Portion $P1_1^{323}$: 1 MLS sequence generated with [16, 15, 4, 2, 0].
  Portion $P1_1^{324}$: 1 MLS sequence generated with [16, 11, 13, 11, 0].
  Portion $P1_1^{325}$: 1 MLS sequence generated with [16, 14, 13, 5, 0].

Portion $P1_1^2$: string of 5 MLS sequences generated with [13, 12, 11, 8, 0].

Portion $P1_1^{33}$: string of 5 MLS sequences such that:
  Portion $P1_1^{331}$: 1 MLS sequence generated with [16, 14, 12, 7, 0].
  Portion $P1_1^{332}$: 1 MLS sequence generated with [16, 14, 11, 7, 0].
  Portion $P1_1^{333}$: 1 MLS sequence generated with [16, 14, 9, 7, 0].
  Portion $P1_1^{334}$: 1 MLS sequence generated with [16, 14, 9, 4, 0].

Portion $P1_1^{335}$: 1 MLS sequence generated with [16, 14, 8, 3, 0].
Portion $P1_1^2$: string of 5 MLS sequences generated with [13, 12, 11, 8, 0].
Portion $P1_1^{34}$: string of 5 MLS sequences such that:
  Portion $P1_1^{341}$: 1 MLS sequence generated with [16, 13, 12, 11, 0].
  Portion $P1_1^{342}$: 1 MLS sequence generated with [16, 13, 12, 7, 0].
  Portion $P1_1^{343}$: 1 MLS sequence generated with [16, 13, 11, 6, 0].
  Portion $P1_1^{344}$: 1 MLS sequence generated with [16, 13, 9, 6, 0].
  Portion $P1_1^{345}$: 1 MLS sequence generated with [16, 13, 6, 4, 0].
Portion $P1_1^2$: string of 5 MLS sequences generated with [13, 12, 11, 8, 0].

The invention claimed is:

1. A method for obtaining at least one acoustic parameter of an environment, the method comprising:
   emitting a sound signal emitted by an emission device;
   receiving a sound signal received by at least one reception device; and
   for each of said at least one reception device:
     determining an impulse response of the environment at a position of said reception device; and
     obtaining an acoustic parameter of the environment on the basis of the impulse response;
   wherein said method further comprises:
   estimating of a sampling frequency shift between the emission device and said reception device on the basis of at least one impulse response obtained on the basis of at least one portion of the sound signal received and of a corresponding portion of the sound signal emitted;
   estimating a temporal shift between the emission device and said reception device on the basis of at least one impulse response obtained on the basis of at least one portion of the sound signal received and of a corresponding portion of the sound signal emitted;
   obtaining a corrected sound signal received by applying, to the sound signal received by the reception device, a sampling frequency shift correction and a temporal shift correction on the basis of said estimations;
   determining said impulse response of the environment being obtained on the basis of at least one impulse response obtained on the basis of at least one portion of the corrected sound signal received and of a corresponding portion of the sound signal emitted,
   wherein the estimating the temporal shift between the emission device and said reception device is obtained on the basis of a comparison, for at least one portion of the sound signal emitted, between:
     the position of the maximum amplitude of the impulse response obtained on the basis of the portion of the sound signal emitted and of a corresponding portion of the sound signal received, and
     the position of the maximum amplitude of the ideal impulse response obtained on the basis of the portion of the sound signal emitted and of a theoretical sound signal received identical to the portion of the sound signal emitted.

2. The method as claimed in claim 1, further comprising a preliminary step of obtaining at least one characteristic of the environment, the at least one characteristic of the environment being taken into account to parametrize said sound signal emitted.

3. The method as claimed in claim 1, further comprising cutting the sound signal received into said portions of signal received, the cutting being performed on the basis of the corresponding portions of the sound signal emitted.

4. The method as claimed in claim 1, wherein the estimating the sampling frequency shift between the emission device and said reception device comprises the obtaining of a first estimation of the sampling frequency shift by a maximization, by varying the sampling frequency of the sound signal received of the maximum amplitude of the impulse response obtained on the basis of a portion of the sound signal emitted and of a corresponding portion of the sound signal received.

5. The method as claimed in claim 4, wherein the estimating of the sampling frequency shift between the emission device and said reception device comprises a refinement of said first estimation on the basis of a comparison, for several successive portions of the sound signal emitted, between:
   the position of the maximum amplitude of the impulse response obtained on the basis of the portion of the sound signal emitted and of a corresponding portion of the sound signal received re-sampled at the sampling frequency corresponding to said maximization, and
   the position of the maximum amplitude of the ideal impulse response obtained on the basis of the portion of the sound signal emitted and of a theoretical sound signal received identical to the portion of the sound signal emitted.

6. The method as claimed in claim 1, further comprising deleting invalid sequences of the corrected sound signal received, the invalid sequences corresponding to losses of packets of the sound signal emitted.

7. The method as claimed in claim 6, wherein the sound signal emitted comprises temporal tags and the invalid sequences of the corrected sound signal received are identified by comparing:
   a duration between two consecutive tags for the impulse response obtained on the basis of at least one portion of the sound signal emitted comprising the two tags and of a corresponding portion of the corrected sound signal received, and
   the duration between the two tags for the sound signal emitted.

8. The method as claimed in claim 6, wherein said impulse response of the environment is calculated on the basis of at least one portion of the corrected sound signal received in which the invalid sequences have been deleted and of a corresponding portion of the sound signal emitted in which the sequences corresponding to the invalid sequences have been deleted.

9. The method as claimed in claim 1, wherein the sound signal emitted comprises at least one portion comprising the repetition of at least one sequence, said impulse response of the environment being obtained by performing:
   a calculation of the impulse response on the basis of each of these sequences and of corresponding sequences of the sound signal received;
   an average of the impulse responses within each of said portions; and then
   an average of the averages for all said portions.

10. The method as claimed in claim 1, wherein the portions of the sound signal emitted comprise at least one sequence chosen from among:
   an MLS sequence ("Maximum Length Sequence");
   an IRS sequence ("Inverse Repeated Sequence");
   a TSP sequence ("Time-Streched Pulses"); and
   a "Logarithmic SineSweep" sequence.

11. A non-transitory computer-readable medium storing a computer program that, when executed by a computer, causes the computer to execute the method for obtaining at least one acoustic parameter as claimed in claim 1.

12. A terminal, comprising:
a communication module able to dispatch a sound signal to an emission device able to play back the sound signal in the form of a sound emitted in an environment;
a microphone able to receive a sound signal received;
a processing module configured to:
determine an impulse response of the environment at the position of said terminal;
obtain an acoustic parameter of the environment on the basis of the impulse response;
estimate a sampling frequency shift between the emission device and said terminal on the basis of at least one impulse response obtained on the basis of at least one portion of the sound signal received and of a corresponding portion of the sound signal emitted;
estimate a temporal shift between the emission device and said terminal on the basis of at least one impulse response obtained on the basis of at least one portion of the sound signal received and of a corresponding portion of the sound signal emitted;
obtain a corrected sound signal received by applying, to the sound signal received, a sampling frequency shift correction and a temporal shift correction on the basis of said estimations; and
determine said impulse response of the environment on the basis of at least one impulse response obtained on the basis of at least one portion of the corrected sound signal received and of a corresponding portion of the sound signal emitted
wherein the processing module is configured to obtain the temporal shift between the emission device and said reception device on the basis of a comparison, for at least one portion of the sound signal emitted, between:
the position of the maximum amplitude of the impulse response obtained on the basis of the portion of the sound signal emitted and of a corresponding portion of the sound signal received, and
the position of the maximum amplitude of the ideal impulse response obtained on the basis of the portion of the sound signal emitted and of a theoretical sound signal received identical to the portion of the sound signal emitted.

13. A system for obtaining at least one acoustic parameter of an environment, the system comprising:
an emission device for emitting a sound signal emitted;
at least one reception device for receiving a sound signal received;
a module for determining an impulse response of the environment; and
a module for obtaining an acoustic parameter of the environment on the basis of the impulse response;
a module for estimating a sampling frequency shift between the emission device and said reception device on the basis of at least one impulse response obtained on the basis of at least one portion of the sound signal received and of a corresponding portion of the sound signal emitted;
a module for estimating a temporal shift between the emission device and said reception device on the basis of at least one impulse response obtained on the basis of at least one portion of the sound signal received and of a corresponding portion of the sound signal emitted; and
a module for obtaining a corrected sound signal received obtained by applying, to the sound signal received by the reception device, a sampling frequency shift correction and a temporal shift correction on the basis of said estimations,
wherein the module for determining the impulse response of the environment being configured to determine said impulse response of the environment on the basis of at least one impulse response obtained on the basis of at least one portion of the corrected sound signal received and of a corresponding portion of the sound signal emitted, and
wherein the module for estimating the temporal shift between the emission device and said reception device obtains the temporal shift on the basis of a comparison, for at least one portion of the sound signal emitted, between:
the position of the maximum amplitude of the impulse response obtained on the basis of the portion of the sound signal emitted and of a corresponding portion of the sound signal received, and
the position of the maximum amplitude of the ideal impulse response obtained on the basis of the portion of the sound signal emitted and of a theoretical sound signal received identical to the portion of the sound signal emitted.

* * * * *